Figure 1:
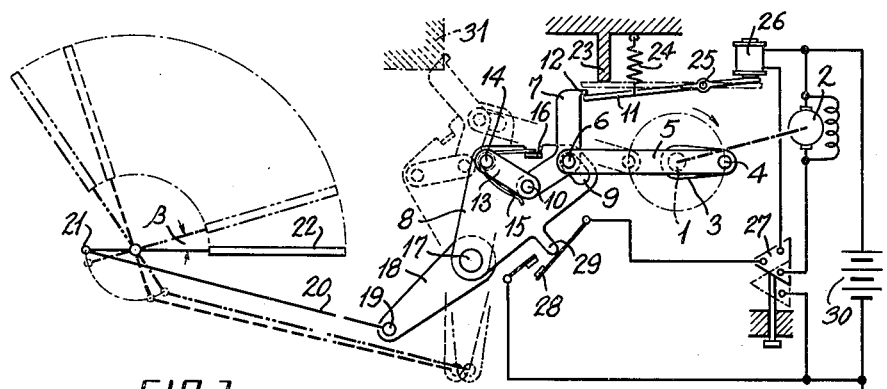

INVENTOR.

MASUMI KATO

United States Patent Office 3,006,013
Patented Oct. 31, 1961

3,006,013
APPARATUS FOR AUTOMATICALLY ACTUATING AND STOPPING A WIPER OR WIPERS FOR VEHICLES
Masumi Kato, Toyoake-cho, Aichi-gun, Aichi-ken, Japan, assignor to Nippon Denso Kabushiki Kaisha, Kariya-shi, Aichi-ken, Japan
Filed Feb. 26, 1959, Ser. No. 795,785
Claims priority, application Japan Oct. 13, 1958
7 Claims. (Cl. 15—250.17)

This invention relates to an apparatus for actuating and stopping a wiper or wipers for vehicles, and more particularly to the apparatus of this kind comprising in combination an electric source, an electric motor and at least one wiper to be swung reciprocatingly by said electric motor through a linkage mechanism, said wiper being able to be stopped in a determined position automatically by opening of at least one electric circuit including said electric motor.

In an apparatus of this kind well known in the art the wiper can be stopped automatically in a determined position which does not obstruct sight of a driver of a vehicle on which the apparatus is installed. In this apparatus, however, as the wiper is stopped within its wiping range, sometimes, the wiper can be stopped in sight of the driver on account of change of its stopping position due to a change in the resistance of the windshield glass which is to be wiped.

Particularly speaking, in general, when the rain has stopped and the operation of the electric motor of the wiper is about to be terminated, the glass which has been wiped is not yet dried completely and produces a greater resistance against the wiper, so that the wiper link and arm are bent more intensely than in rainfall, resulting in narrowing the wiping range.

Therefore, when the wiper is so arranged that normally its arm is driven to a position adjacent to the sash and can be stopped in this extreme position, the wiper arm would strike the sash in rainfall, because the wiping resistance, i.e., the resistance of the windshield glass against the wiper arm, becomes less in rainfall and thus, the wiping range of the wiper becomes larger. Especially in an intense rainfall the wiping resistance decreases remarkably and the wiper arm would strike the sash more strongly by its inertia overcoming the wiping resistance in case of its downward movement.

This phenomenon is accompanied with undesirable noises and results in damage to the wiper, such as deformation or wear of the wiper gum blade, etc.

If in order to remove the above mentioned shortcoming, the wiper is so arranged that its arm can be stopped in such a position that the arm can not strike the sash even in case of decreased wiping resistance in rainfall, the wiper arm can not be driven enough to reach the sash with its free end, which is then stopped above the sash, when the rain stops and the electric motor for the wiper is stopped. In this case, the wiper arm stops in the wiping range of the wiper, resulting in obstruction of the driver's vision and an eventual serious accident.

The primary object of the present invention is to provide an automatic apparatus of the aforementioned type, whereby the wiper is always stopped, irrespective of its operating position, in a place which does not obstruct the driver's vision and it can operate within such a wiping range so that even if the wiping resistance decreases greatly the wiper arm can not strike the sash.

A further object of the invention is to provide a simple and cheap apparatus of this kind, whereby any complicated electric switch may be dispensed with and the addition of only one electric terminal is needed therefor.

Another object of the invention is to provide an apparatus of this kind whereby each of the electric switches included in the apparatus needs to be closed and opened only once for operating the wiper and stopping the same, respectively.

Figure 2:
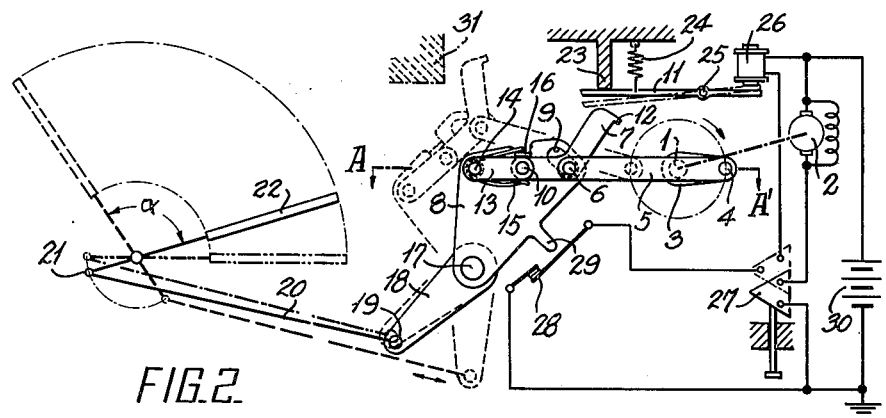
Figure 4:
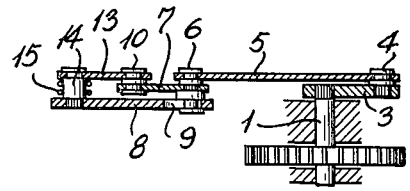
Figure 3:
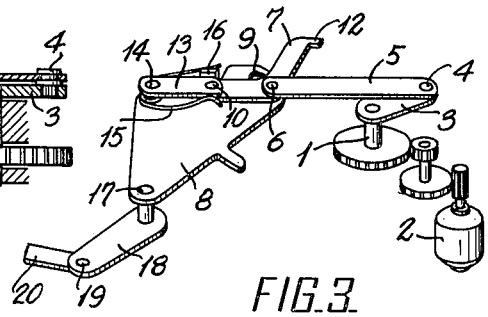

The means by which the foregoing and other objects are accomplished and the methods of their accomplishment will readily be understood from the following description with reference to the accompanying drawings of one embodiment of the invention. In the drawings, FIG. 1 shows a schematic view of the apparatus according to the invention, in the stopped position, together with an electrical connection diagram, FIG. 2 shows a schematic view similar to FIG. 1 but in an operating position, FIG. 3 is a perspective view of the essential part of the apparatus, corresponding to FIG. 2, and FIG. 4 is a sectional view along line A—A' in FIG. 2.

Referring now to the drawings, in which the same reference numerals are applied to indicate the same parts, the apparatus has an electric motor 2, by which a drive shaft 1 for the wiper is to be driven at a suitable speed reduced through a speed reduction gear (not shown) interposed between the shaft 1 and the motor 2. To the shaft 1 there is fixed one end of an arm 3 which carries at its other end, a pin 4 fixed thereto. The free end of the pin 4 is loosely fitted into one end of a rod 5 whose other end is connected to a pin 6 which is fitted into the rod 5 also loosely.

The intermediate portion of the pin 6 is fixed to the middle part of an L-shaped plate, i.e., a double-armed or bell-crank lever 7, while the free end of the pin 6 is so inserted into a slot 9 of a lever 8 as to be movable along the slot 9. A pin 10 is fixed to one end of the lever 7 which is provided at its other end with a projection 12, which is adapted to cooperate with an adjustable stop 11 in such a manner as will be explained later. The pin 10 and a pin 14 are fitted loosely into both ends of a link 13. Thus, the lever 7 and the link 13 constitute a toggle joint which is one of mechanical deformation means in this invention.

A coil spring 15 is mounted onto the intermediate portion of the pin 14. The spring 15 is engaged at its one end with a bent projection 16 of the lever 8 and is biased at its free end against the lateral side of the pin carrying end of the lever 7 so as to aline the pins 14, 10 and 6 (see FIG. 2). That is, the spring 15 has a tendency to force the pins 14, 10 and 6 always to be in a same plane including therein the longitudinal axes of these pins. The pin 14 is fixed to the lever 8. A rotatory shaft 17 which is fixed at one end to the lever 8 and at the other end to an external lever 18 can rotate about its axis fixed relatively to the casing of the apparatus (not shown). To the front end of the lever 18 is fixed a pin 19 which is loosely fitted into one end of a link rod 20 whose other end is pivoted by a driving pin 21 to one end of a wiper arm 22.

The adjustable stop 11 which can swing about its hinge pin 25 is always pulled by a coil spring 24 toward its stop 23 fixed to the casing of the apparatus. An electromagnet 26 which is inserted into an electric circuit including the electric motor 2 and an electric source here shown as a storage battery 30, is adapted to attract the ratchet 11 in opposition to the action or bias of the spring 24 when the electromagnet is energized. As hereinafter explained, during operation of the wiper the adjustable stop 11 is adapted to touch the stop 23 by bias of the spring 24 without touching the projection 12 of the lever 7, as shown by full line in FIG. 2, but when the circuit to the electric motor is broken, the stop 11 is situated in a position where it is engaged by the projection 12 of the lever 7, as shown by full line in FIG. 1.

The electric circuit of the apparatus including the motor 2 and the battery 30 is controlled by a hand switch of the push button type including a triangular contact conductor 27 as well as an automatic switch having a pair of contacts 28, one of which is movable and carried by the front end of a resilient arm to be operated by a projection 29 of the lever 8. The connection point of the electromagnet with the motor 2 is connected with the battery 30 whose one end is grounded as usual.

The aforementioned apparatus operates as follows:

For starting the apparatus, one pulls the push button into a position where the triangular conductor 27 is brought from the position shown by full line into that shown by broken line in FIG. 1. The electric circuit of the battery 30 and the motor 2 is thus closed, resulting in operation of the motor and, consequently, rotation of the drive shaft 1. The pin 4 fixed to the front end of the arm 3 made integral with the shaft 1 revolves about the shaft 1, whereby the rod 5 loosely mounted on said pin 4 is pushed toward the lever 8 in accompaniment with movement of the pin 6 in the same direction with the pin 4. As this pin 6 is made integral with the double armed lever 7 and inserted into the slot 9 of the lever 8, the pin 6 then pushes the lever 8 through the slot 9. Because the rotating shaft 17 can rotate only about its axis which is fixed relatively to the casing of the apparatus, the lever 8 is moved, i.e., swung into a position shown by broken line in FIG. 1, with the result that the wiper arm 22 is displaced by the lever 18 through the rod 20 as shown by broken line in FIG. 1, because the shaft 17, the levers 8 and 18 are fixed together integrally.

On the other hand, when in the early stage of this movement the double armed lever 7 begins to be pushed toward the position shown by broken line in FIG. 1, the front end of the adjustable stop 11, which has been pushed down by the projection 12 of the lever 7, begins to be released gradually from the projection. When the stop 11 has been released completely, it is then pulled by the spring 24 until it abuts the stop 23. That is, shortly after the start of the apparatus the adjustable stop 11 moves automatically into the position shown in broken line in FIG. 1.

The automatic switch with the contacts 28 is closed automatically by displacement or withdrawal of the projection 29 due to the outward movement of the lever 8. Thus, the operating state of the apparatus as shown in FIG. 2 occurs approximately after a half revolution of the drive shaft 1.

After the next half revolution of the driving shaft 1, the lever 8 returns to its initial position or state. More specifically, during the next half revolution the pin 4 is pulled from the position shown by broken line toward that shown by full line in FIG. 2, so that it pulls the pin 6 toward the shaft 1. At the beginning of this half revolution the pin 6 touches the outer end of the slot 9, so that it begins thereafter to slide inwardly along the slot 9, without transmitting any force to the lever 8.

However, as the pin 6 is fixed to the double armed lever 7 as mentioned above, the pulling force acting on the pin 6 is transmitted to the lever 7 which in turn pulls the pin 10 fixed to its one end as well as the pin 14 through the link 13 loosely mounted onto the pin 10. Because the pin 14 is fixed to the lever 8 the latter is subjected to a force to restore it to the position shown by full line in FIG. 2. In this case the lever 8 is also subjected to the resistance of the wiper arm 22 through the shaft 17, the pin 19 and the rod 20, so that it remains in this position till a force necessary for overcoming this resistance acts upon the lever 8, whereby only the link 13 and the lever 7 are pulled and moved relatively to the lever 8, till the pins 14, 10 and 6 lie in a straight line, as shown in FIG. 2. The pins 10 and 6 are not hindered in movement necessary for alinement of these pins except by friction between the pin 6 and the slot 9 along which the pin 6 slides. Furthermore, the pins 10 and 6 are aided by the spring 15 in said movement, which is thus performed very easily.

By further strengthening the spring 15 or by arranging a stop 31 on the casing of the apparatus as shown by broken line, one can aline the above mentioned three pins 14, 10 and 6 when they come into the position shown by broken line, but this may be unnecessary, for the state of the toggle joint shown in FIG. 1 remains during only approximately one rotation of the shaft 1 in case of starting the apparatus.

After the pins 14, 10 and 6 have been alined, the lever 8 is pulled to swing clockwise, but in this case the adjustable stop 11 is positioned as shown by full line in FIG. 2 and does not impinge upon the double armed lever 7, so that the pins 14, 10 and 6 remain alined.

When the drive shaft 1 continues to rotate further, the pin 4 begins to push the rod 5 and the pin 6, with the result that the lever 8 begins to swing counter-clockwise, because in this case theoretically any component force by which the toggle joint is compressed to be bent into a V-shape is not produced, so that the pins 14, 10 and 6 remain alined. Practically, however, on account of inaccuracies in the manufacture of the parts of the linkage mechanism it can occur that the pins 14, 10 and 6 are alined not exactly, with the result that an eventual small component force or vibration can displace the pin 10 in such a manner that the link 13 and one arm of the lever 7 forms a V-shape as shown in FIG. 1. The spring 15 also serves to prevent this phenomenon from accurring. Thus, after the drive shaft 1 completes its first single revolution upon starting of the apparatus, the toggle joint remains always in its aligned or straight condition.

The alignment of the pins 6, 10 and 14 means kinematically that the pin 6 is fixed directly to the lever 8 as in a well known apparatus of this kind. Therefore, so long as the circuit of the electric motor is closed, the wiper arm 22 swings reciprocatingly within the wiping range of an angle α whose borders are shown by the wiper arms shown by full line and broken line in FIG. 2. During operation of the apparatus the automatic switch with the contacts 28 remains unactuated by the projection 29.

Nextly, stopping function of the apparatus will be explained.

In order to stop the reciprocating swing of the wiper arm 22, one pushes the push button of the hand switch, i.e., wiper switch. In this case the triangular conductor 27 is displaced into a position shown by broken line in FIG. 2, whereby the ground circuit of the electric motor 2 is grounded not directly by the conductor 27 but through an automatic stop circuit including the automatic switch with the contacts 28. At the same time the ground circuit of the electromagnet 26 which has been opened is closed also through the automatic stop circuit.

The electric motor 2 continues to rotate still in spite of pushing of the push button switch mentioned above. The electromagnet 26 is now energized to attract one end of the adjustable stop 11 serving as an armature, which adjustable stop then swings about the pin 25 in opposition to the bias of the spring 24 into the position shown by broken line in FIG. 2. If at this moment the double armed lever 7 is positioned as shown by full line in FIG. 2, the front end of the lever 7 touches that of the adjustable stop 11, but because the front end of the adjustable stop 11 is chamfered while the front end of the lever 7 is smoothened to have no roughness, the lever 7 moving integrally with the other linkage mechanism parts can not be stopped by the adjusable stop but only slides along the latter. Consequently, the adjustable stop 11 in this case can move into the position shown by broken line after the lever 7 slides along and departs from the front end of the adjustable stop 11 toward the position shown by broken line in FIG. 2. Except for this special case, the adjustable stop can move at once in response to energization of the electromagnet 26 into the position shown by chain line in FIG. 2.

In any case, the double armed lever 7 always begins to be brought into engagement with the adjustable stop 11 shortly before the position shown by full line in FIG. 1 when the lever 8 swings clockwise, that is, the lever 7 is pulled by the pin 4.

After the level 7 is engaged with the adjustable stop 11 and stopped by the latter, the electric motor 2 still continues to rotate, and consequently the pin 6 is still moved inward to the position shown in full line in FIG. 1. During this inward movement of the pin 6 a force is produced to turn the lever 7 about the engaging point of the lever 7 with the adjustable stop 11 with the result that the alinement of the pins 6, 10 and 14 is broken and the toggle joint consisting of the lever 7 and the link 13 is compressed into a V-shape as shown in FIG. 1. This phenomenon can occur on account of existence of the slot 9.

Thus, the distance between the pins 6 and 14 decreases, but as the position of the pin 6 is maintained always constant by the pin 4, the pin 14 has to move inwardly by a certain distance which corresponds to the amount of decrease of the distance between the pins 6 and 14, and the lever 8 connected integrally with the pin 14 swings clockwise additionally in response to the movement of the pin 14. Synchronously with this additional swing of the lever 8 its projection 29 opens the automatic switch of the automatic stop circuit, whereby the electric motor 2 is de-energized.

Mechanically this additional swing of the lever 8 produces the final swing of an angle $\beta$ beyond the wiping range, whereby the wiper arm 22 is stopped and housed in a predetermined position as shown by full line in FIG. 1.

Although simultaneously with opening of the automatic switch the electromagnet 26 is de-energized, becomes inactive, the front end of the adjustable stop 11 is pressed fast against the projection 12 of the lever 7 by the spring 24, so that locking of the lever 7 by the adjustable stop 11 can be continued without energization of the electromagnet 26.

From the foregoing it will be seen that many modifications of the specific disclosed form of the invention may be resorted to, and it is to be understood that the scope of the invention is to be ascertained solely by the appended claims.

I claim:

1. An apparatus for automatically actuating and stopping a wiper or wipers for vehicles, comprising a linkage mechanism, an electric motor for connection to an electric source, at least one wiper to be swung reciprocatingly by said electric motor through said linkage mechanism, at least one electric circuit including said electric motor by opening of which circuits said wiper is able to be stopped automatically in a determined position, and which is adapted to be opened completely in two steps of switching operation, an electric means inserted into said circuit and adapted to be actuated only in time interval between said two steps, and a mechanical deformation means inserted into said linkage mechanism and adapted to be actuated by said electric means, said mechanical deformation means being adapted to shift and stop the wiper into a predetermined position beyond a required wiping range and to open said electric circuit completely, said linkage mechanism having four pivot elements of which three pivot elements are included in said deformation means, only two of said pivot elements including one in said deformation means being rotary during normal wiping action, the other two being non-rotary during normal wiping action and rotary during shifting of the wiper into said predetermined position.

2. An apparatus according to claim 1, wherein said deformation means consist of a toggle joint.

3. An apparatus as set forth in claim 2, wherein the rotary pivot element in said deformation means is at an outer pivot of said toggle joint, the two non-rotary pivots being at the other outer pivot and at the knuckle of said toggle joint.

4. An apparatus according to claim 2, wherein a spring is adapted to act upon said toggle joint to maintain the same in straight condition.

5. An apparatus according to claim 1, wherein said linkage mechanism includes an arm rotating together with the driving shaft of the wiper, a connecting rod pivoted at one end thereof to said arm and a lever connected with the other end of said rod movably relatively, a toggle joint interposed between said lever and said connecting rod, said toggle joint comprising a link having one end pivotally connected to said lever and a double armed lever pivotally connected to the other end of said link, and the middle part of the double armed lever of said toggle joint being shiftable relatively to the first-mentioned lever.

6. An apparatus according to claim 5, wherein said two levers are engaged with each other by a pin and a slot receiving said pin, said pin being the rotary pivot of said toggle joint.

7. An apparatus according to claim 1, wherein a hand operated wiper switch and an automatic switch are inserted into said electric circuit and the latter switch is opened by said deformation means.

References Cited in the file of this patent

UNITED STATES PATENTS

| | | |
|---|---|---|
| 2,800,675 | Oishei et al. | July 30, 1957 |
| 2,825,019 | Harrison | Feb. 25, 1958 |
| 2,832,226 | Dyer | Apr. 29, 1958 |
| 2,841,994 | Dyer et al. | July 8, 1958 |